United States Patent [19]

Suzuki

[11] Patent Number: 4,706,099
[45] Date of Patent: Nov. 10, 1987

[54] LASER BEAM IMAGE PRINTING DEVICE WITH MULTIPLE SHEET SIZE FEEDING MECHANISM

[75] Inventor: Shigeru Suzuki, Yokohama, Japan

[73] Assignee: Ricoh Corporation, Tokyo, Japan

[21] Appl. No.: 894,133

[22] Filed: Aug. 7, 1986

[30] Foreign Application Priority Data

Aug. 10, 1985 [JP] Japan .................... 60-176101

[51] Int. Cl.$^4$ ............................................ B06K 15/16
[52] U.S. Cl. ...................................... 346/160; 355/13
[58] Field of Search ............... 355/13, 14 R; 346/160

[56] References Cited

U.S. PATENT DOCUMENTS 3,718,394  2/1973  Tysko et al. ................ 355/14 R
4,440,487  4/1984  Miura ........................ 355/14 R
4,607,946  8/1986  Uchiyama et al. .......... 355/14 R Primary Examiner—William H. Beha, Jr.
Attorney, Agent, or Firm—Mason, Fenwick & Lawrence

[57] ABSTRACT

In an image printing device suitable for an electrophotographic copier, at least two narrower images are printed concurrently on separate sheets. A high speed, large format machine is effectively utilized even when smaller size images are to be printed.

11 Claims, 10 Drawing Figures

LASER BEAM IMAGE PRINTING DEVICE WITH MULTIPLE SHEET SIZE FEEDING MECHANISM

BACKGROUND OF THE INVENTION

The present invention relates to a line print means suitable for a printing unit of an electrophotographic copier which scans the whole width of the maximum print size and, more particularly, to an image printing device capable of high speed processing when a plural number of smaller size images relative to the maximum print size are to be printed.

As well known in the art, in an electrophotographic copier, for example, a two-dimensional image is formed on a drum, with a photoconductive layer coated thereon, by first scanning linearly in the axis direction thereof, namely in the width direction, and then by rotating the drum before the next scan so as to move the scanning position in the length direction. Such a device is usually called as a line printer. In an electrophotographic laser printer, the printing speed does not change even when the printing width becomes narrower, because it always scans across the whole width of the maximum print size. Particularly in a printer with a laser charge-dissipater, wherein the laser beam is scanned in the width direction of the drum by a rotating polygonal mirror, the rotating rate of the drum, the scanning speed of the laser beam and the scanning width of the laser beam are all difficult to change. Accordingly, the printing speed does not increase even with narrower printing width.

Recently, a line printer of larger format is becoming popular, in which a photoconductive drum and a writing means together enable a large print like an A0 (46.8×33.1 inches) or E size drawing. Such a large machine was usually used for the preparation of the originals of large engineering drawings, but in view of the recent progress of CAD (computer aided design) devices, there is a need in a single printer that can print various sizes of image at a very high speed. However, when a smaller size print is processed in a line printer of larger format, the print speed remains unchanged and it takes a time corresponding to the desired number of prints.

SUMMARY OF THE INVENTION

It is therefore an object of the present invention to shorten the printing time when smaller width images relative to the width of the maximum print size of the machine are necessary.

In order to attain the above object, according to the present invention, when the size of the image to be printed is no greater than one half of the width of the maximum print size, a plurality of images are stored in advance in the bit map memory. For example, when the maximum print size is the A0 (33.1 inch in width), two A2 (23.4×16.5 inches) images can be accomodated when they are placed lengthwise in contact at the longer side with each other. With such an alignment, the printing speed is virtually doubled. Similarly, when a bit map memory corresponding to an A0 size is provided, four A2 size images can be placed.

"Bit map memory" is a word well used in the art, but it is not necessarily a map. In fact, it is a group of large scale integrated circuit, which is sufficient to store the entire maximum binary data at every dot throughout the entire maximum print size like A0. If 16 dots/mm density is needed, about one thousand 256K DRAMs are necessary for this purpose! These huge number of DRAMs are assigned by the control means to all parts of the maximum print unit.

In a preferred embodiment of the present invention, the entire bit map memory is filled with the image data in the same format suitable for the printing, which is simply transmitted to the laser writing unit. Alternatively, the data stored at some part of the bit map memory can be used a number of times, if more than one copy is necessary for a page. For this latter method, the control means should make proper addressing to enable to print at least two copies substantially at the same time.

When the width of the printing sheet is A0 with no other size sheet in reserve, the printed sheet must be cut both in the feed direction and in the transverse direction, if a smaller size image is to be printed. The structure of a cutting mechanism for such two-dimensional cutting is very complicated. Particularly in the feed direction, the cutting position is likely to fluctuate to give wrong sizes. When an odd number of prints are requested, at least one unused section is inevitable.

It is therefore an object of the preferred embodiment of the present invention to avoid cutting in the feed direction, by providing plural sets of sheet supply having a width not more than one half of the width of the maximum print size in addition to a sheet supply having the width of maximum print size and by selecting said plural sets of sheet supply, when a smaller size is required. In an example which will be described later in detail, rolled sheets are provided with a cutting mechanism available only in the transverse direction. Thus, with minimum kinds of rolled sheets, images of various size can be processed without any complicated structure. When a number of copies of a single page are to be printed, the same image data corresponding to that page may be duplicated in the bit map memory. Alternatively, however, one image data may be read a number of times under the instruction of the control means which will be explained later with reference to the example. Similarly, when a number of different pages of the same size is to be printed, the different image data corresponding to each page may be stored in the different partition of the bit map memory. Said different image data are accessed at the same time. A high speed printing such as six A0 pages per minute is thus possible in accordance with the present invention.

The above and other objects, features and advantages of the present invention will become apparent from the following detailed description with reference to the example and the accompanying drawings.

DESCRIPTION OF THE PREFERRED EMBODIMENTS

Figure 1:
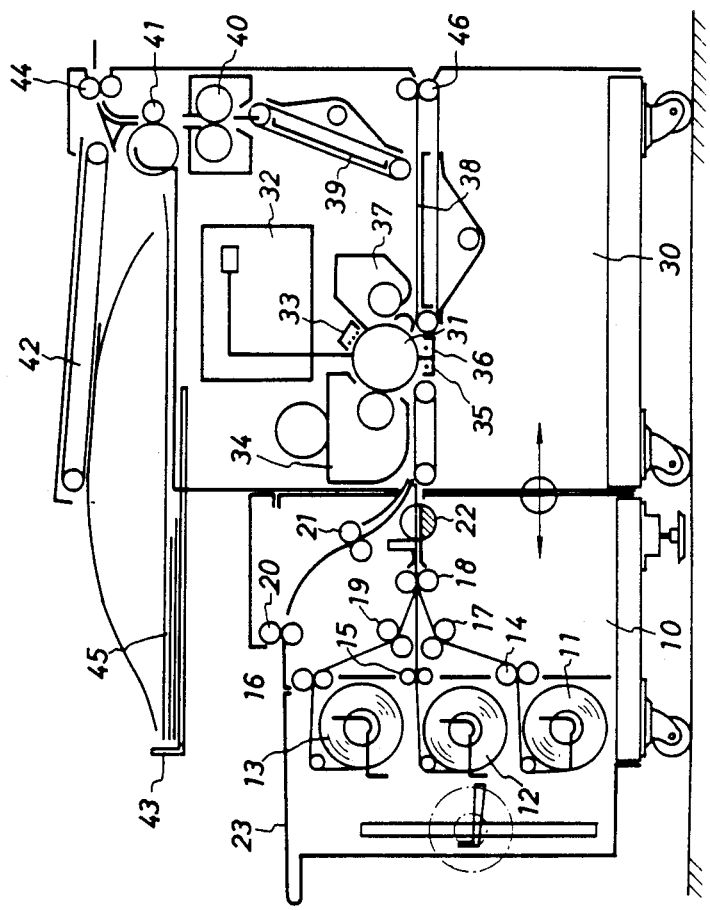
FIG. 1 is a schematic view of an exemplary printer unit according to the present invention.

The present invention will now be explained by way of its preferred embodiments while referring to the drawings.

FIG. 1 shows a schematic view of a digital laser printer unit for practicing this invention. Referring to FIG. 1, the device mainly comprises a sheet feed unit 10 and a printing unit 30. The printing unit 30 has the same constitution, as is commonly used in a digital copying machine, like IBM-3800. That is, it comprises, as printing unit, a photosensitive drum 31, a laser writing unit 32, an electric charger 33, a developing device 34, a transfer charger 35, a detack corona discharger 36, a cleaning unit 37 and the like, in which an electrostatic latent image corresponding to the printing image is formed on the photoconductive drum 31, which is then developed by the developing device 34 and the visualized image in toner is transferred on a printing sheet fed from the sheet feed unit 10.

The printing sheet transferred with the images is forwarded by conveyor belts 38 and 39 and reaches a fixing device 40, where the transferred toner images are fused and fixed on the printing sheet. The printed sheet 45 after the fixing is delivered on a receiving tray 43. In this embodiment, a vacuum back conveyor 42 for conveying the printed sheet is disposed above the receiving tray 43, which enables to send the printed sheet from an exit 44 to an after-treating device, which is not illustrated.

The sheet feed unit 10 in this embodiment comprises 3 sheet feed means 11, 12 and 13, arranged lengthwise in three steps.

Figure 2:
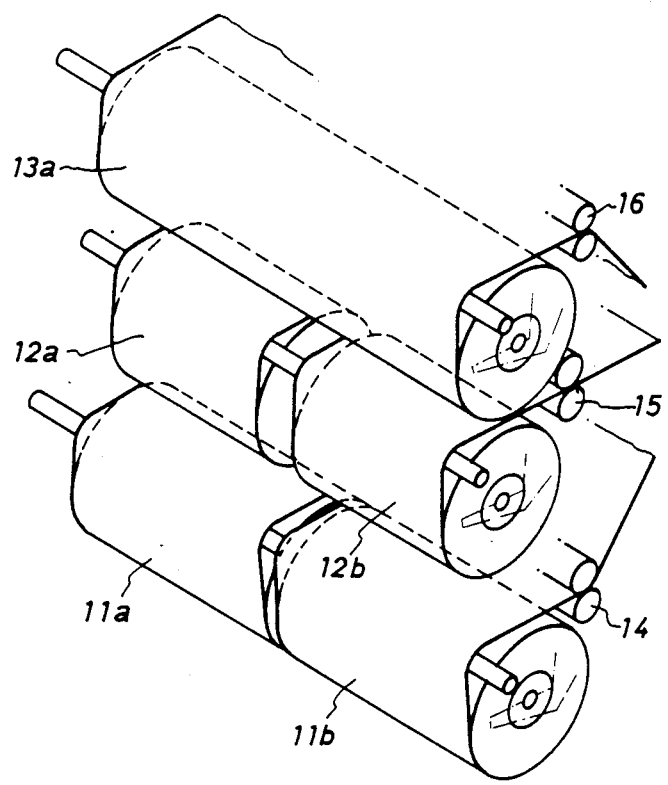
FIG. 2 is an oblique view of an exemplary sheet feed means of a printer unit like the one shown in FIG. 1.

As shown in FIG. 2, the sheet feed means 13 at the top position has a rolled sheet 13a of a large width (A0 width), the sheet feed means 12 at the middle position has two rolled sheets 12a and 12b of a relatively small width (A3 width) and the sheet feed means 11 at the bottom position has two rolled sheets 11a and 11b of a relatively small width (A2 width).

The rolled sheets 12a and 12b are supported at different positions on an identical shaft and a small gap is formed between them. In the same manner, the rolled sheets 11a and 11b are supported on one identical shaft and a small gap is formed between them. Sheet feed drive mechanisms 16, 15 and 14 are disposed at the vicinity of the sheet feed means 13, 12 and 11 at the top, middle and bottom positions, respectively.

Figure 3:
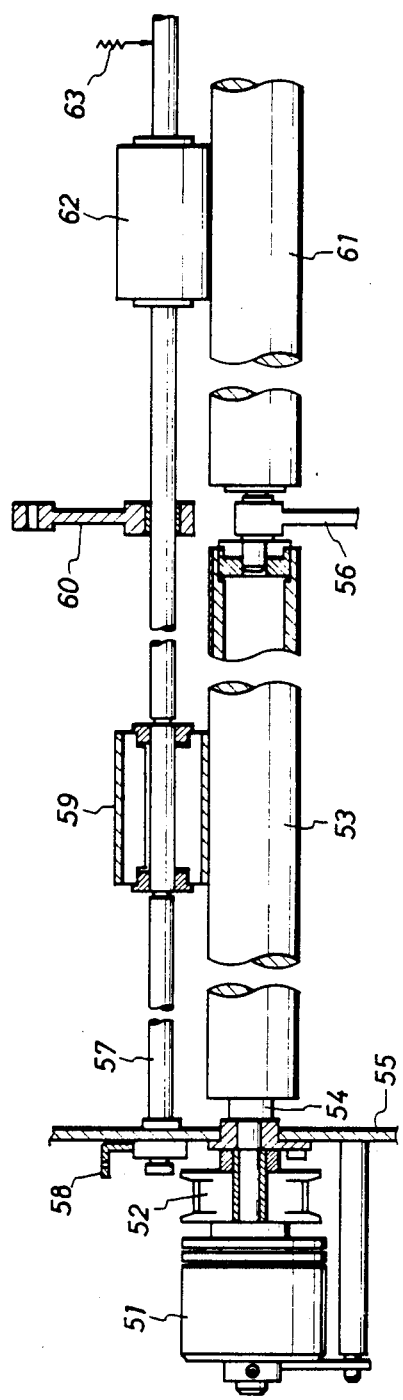
FIG. 3 is an enlarged view of sheet supply rolls, by which two sets of sheet are forwarded to the printer unit in accordance with the present invention.

FIG. 3 shows a portion of the sheet feed drive mechanism 14 at the bottom position. Referring to FIG. 3, there are sheet feed rollers (drive rollers) 53 and 61 and pinch rollers (driven rollers) 59 and 62. One end (top end) of the rolled sheet 11a is put between the sheet feed roller 53 and the pinch roller 59, while one end of the rolled sheet 11b is put between the sheet feed roller 61 and the pinch roller 62.

The sheet feed roller 53 is supported at one end thereof to a roller support bracket 56 and at a shaft 54 formed to the other end thereof to the bearings of a frame 55. A magnetic clutch 51 is connected to one end of the shaft 54 and a drive pulley 52 is coupled to one end of the magnetic clutch 51. The drive pulley 52 is supported on the shaft 54 for idling rotation. The drive pulley 52 is connected by means of a belt, not illustrated, to an electric motor.

Accordingly when the magnetic clutch 51 is "disconnected", the sheet feed roller 53 is stopped, while when the magnetic clutch 51 is energized into "connected" state, the sheet feed roller 53 is rotated. The pinch roller 59 is rotatably mounted on a shaft 57. The shaft 57 is pressed by a lever 58 disposed to both ends of the shaft 57. Eccentricity of rollers and/or change in sheet thickness may be thus absorbed and a constant pressure of the sheet feed rollers on the sheet is realized. A support arm 60 is disposed at the middle portion of the shaft 57.

A driving mechanism, although not illustrated, is disposed on the right of the sheet feed roller 61 and the pinch roller 62 in the same manner as for the sheet feed roller 53 and the pinch roller 59. Accordingly, the rolled sheet 11a and the rolled sheet 11b can separately be driven with each other.

The sheet is typically made of cellulosic paper, but plastic material like polyethylene terephthalate film may be employed. The latter is more expensive, of course, but its dimensional stability is superior.

Referring again to FIG. 1, various rollers 17, 18 and 19 are disposed at the downstream to the sheet feed drive mechanisms 14, 15 and 16, and a rotary knife 22 is disposed further downstream thereto. The rotary knife 22 is disposed along the full width in the direction perpendicular to the feed direction (the transverse direction) for each of the rolled sheets. Accordingly, by actuating the rotary knife 22, all of the rolled sheets can be cut at that position. That is, a sheet of a desired length can be obtained by actuating the rotary knife 22 at a predetermined timing.

In this embodiment, manual sheet feeding is also made possible. In the case of the manual feeding, a sheet is fed from above the sheet feed table 23 toward the right side in the drawing. In this case, the inserted sheet is guided while passing through the feed rollers 20 and 21 to the downstream of the rotary knife 22.

Figure 4:
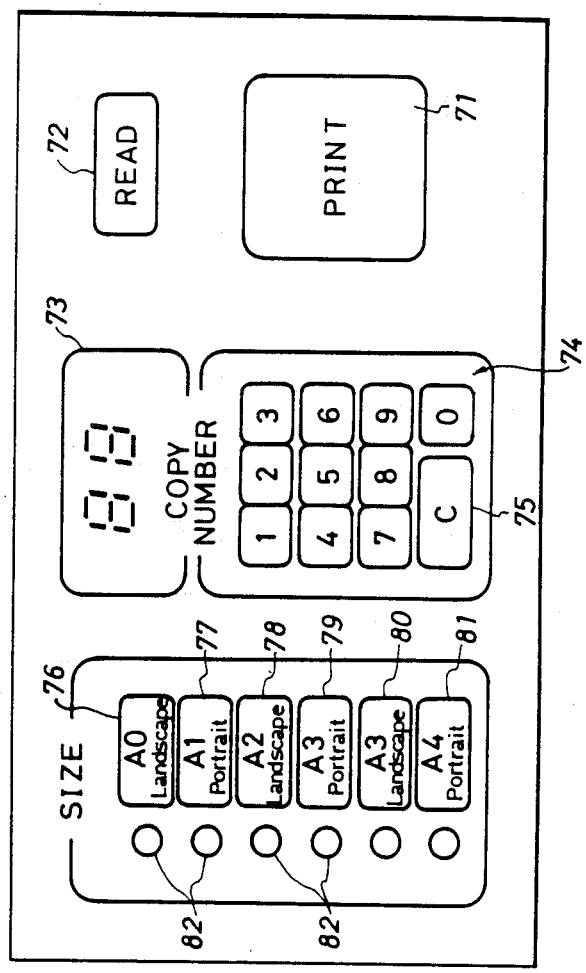
FIG. 4 is a schematic view of an exemplary operating panel suitable for an image printing device in accordance with the present invention.

FIG. 4 shows an operating panel for the printer illustrated in FIG. 1. Referring to FIG. 4, the operating panel comprises print key switch 71, read key switch 72, copy number display 73, ten-key switch 74, clear key switch 75, size designation key switches 76, 77, 78, 79, 80 and 81, and designated size display 82.

Figure 5:
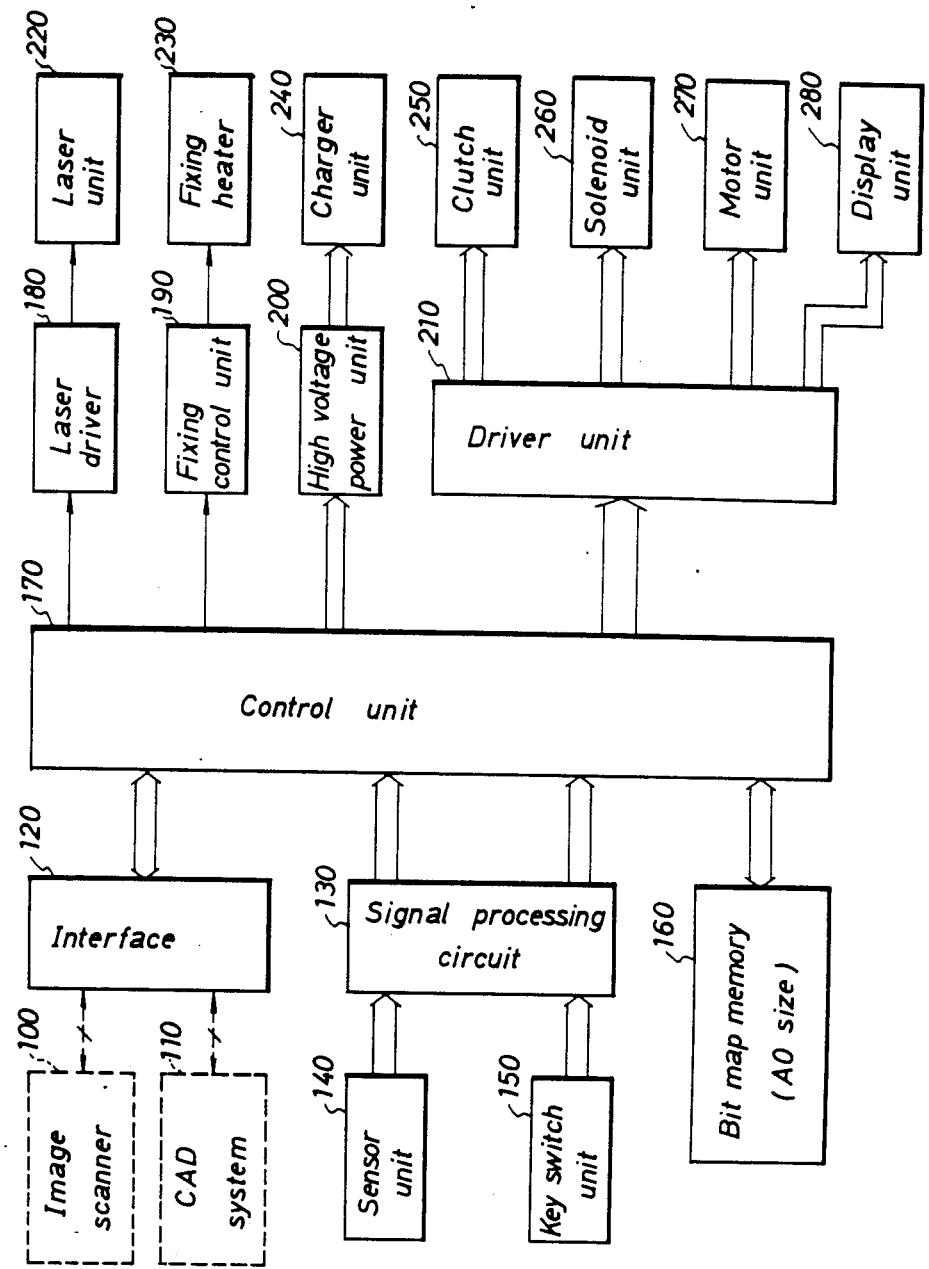
FIG. 5 is a block diagram representing the electric circuit of the image printing device exemplified in FIG. 1.

FIG. 5 shows the block diagram of an electric circuit for the printer illustrated in FIG. 1. Referring to FIG. 5, the device comprises interface unit 120, signal processing circuit 130, sensor unit 140, key switch unit 150, bit map memory 160, control unit 170, laser driver 180, fixing control unit 190, high voltage power supply unit 200, driver unit 210, laser unit 220, fixing heater 230, charger unit 240, clutch unit 250, solenoid unit 260, motor unit 270 and display unit 280. Each block illustrated in FIG. 5 refers to a structure well known in the art, except the logic built-in the control unit 170, which is claimed herein.

An image scanner 100 or a CAD system 110 is connected by way of the interface unit 120 to the device. The data for the images to be printed are transferred from the image scanner 100 or the CAD system 110. The transferred data are stored in the bit map memory 160. In this embodiment, the bit map memory 160 has a memory capacity capable of storing all of the dots over an A0 size area with 16 dots/mm density.

The photoconductive drum 31 illustrated in FIG. 1 is adapted to perform printing for the width greater than the A0 width by the gap between the rolled sheets 11a and 11b. This will be explained later referring to FIG. 6d.

Since rolled sheets of A0, A2 and A3 widths are provided in this embodiment, printing in various sizes and direction are possible. In the case of printing images smaller than A0 size (not greater than ½), a plurality of images can be processed at one time. In this case, the bit map memory 160 is divided into a number of partitions and the image data can be stored in each partition.

Figure 6B:
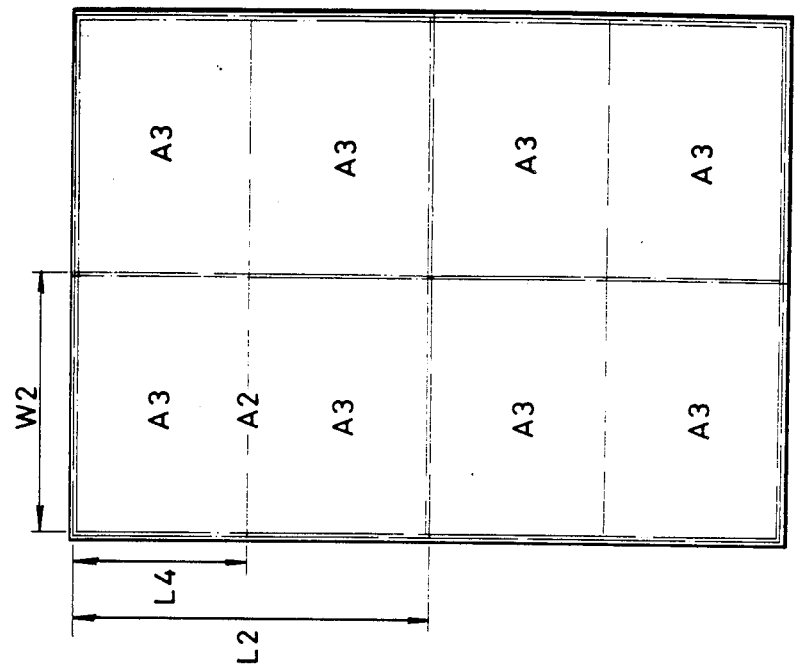
FIGS. 6a, 6b and 6c are conceptional charts showing various ways of the partitions in the bit map memory, respectively, in accordance with the present invention.
Figure 6A:
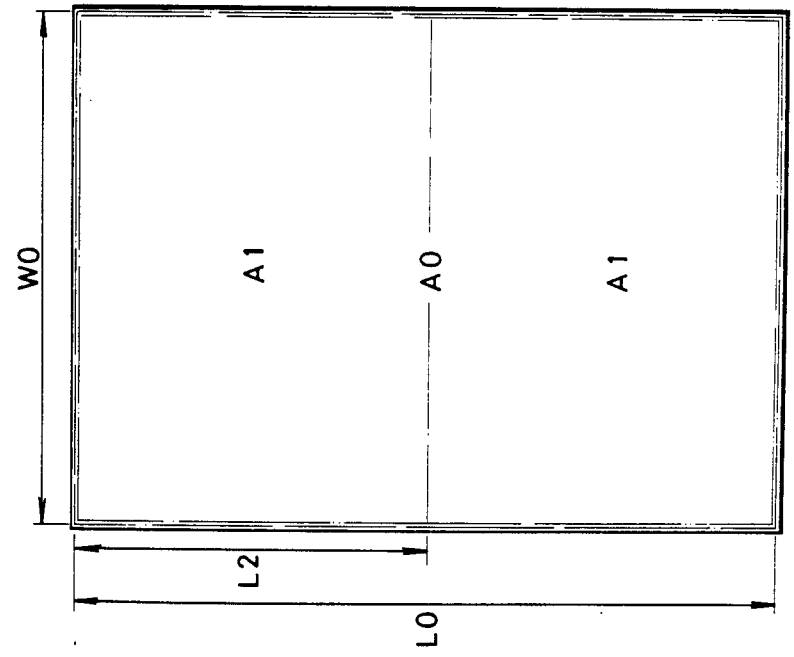
Figure 6D:
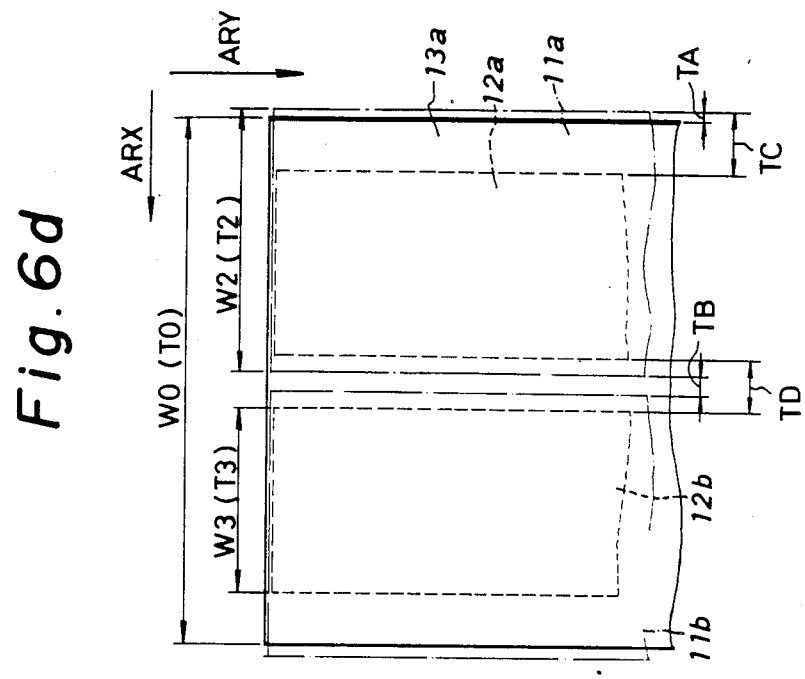
FIG. 6d is a conceptional chart showing a relationship between positions of each sheet supply and a timing for a laser beam scan.
Figure 6C:
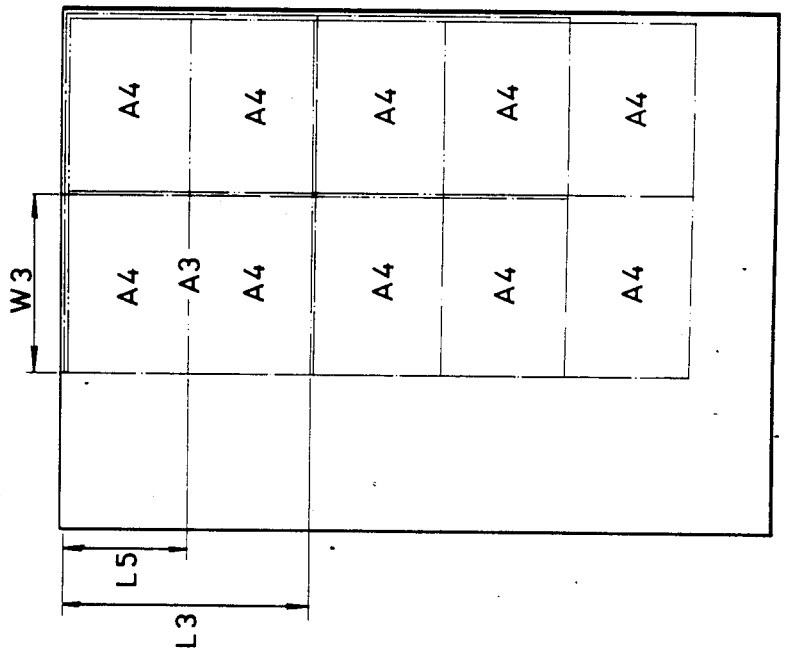

Specifically they can be divided as shown in FIGS. 6a, 6b and 6c. That is, it is possible to arrange one A0 sheet landscape or two A1 sheets portrait when a rolled sheet of A0 width (W0) is used as shown in FIG. 6a; four A2 sheets landscape or eight A3 sheets portrait as shown in FIG. 6b when rolled sheets of A2 width (W2) are used; and four A3 sheets landscape or ten A4 sheets portrait in the case of using rolled sheets of A3 width (W3) as shown in FIG. 6c. In the last case shown in FIG. 6c, however, the bit map memory is not fully used and accordingly this is not the best embodiment of the present invention, although other arrangements may be possible with proper modification of electric circuits. In the case of arranging the A0 sheet landscape, A1 sheet portrait, A2 sheet landscape, A3 sheet portrait, A3 sheet landscape and A4 sheet portrait, respectively, sheets of standard sizes can be obtained by feeding predetermined rolled sheets with proper width and by actuating the rotary knife 22 shown in FIG. 1 on every time corresponding to the lengths L0, L2, L2, L4, L3 and L5. In the need of changing the rolled sheet to be fed, the rolled sheet being used is retracted slightly to the upstream from the rollers 18 as shown in FIG. 1 and the leading edge of the rolled sheet to be selected is put between the rollers 18 and driven for the feeding. For this operation, the sheet feed drive mechanisms 14, 15 and 16 are designed to be rotatable in the reverse direction also.

In this embodiment, the bit map memory 160 has a memory region only enough to cover an A0 size area, while the total length in the width direction of the two rolled sheets 11a and 11b and the gap therebetween is greater than the W0 width. That is, since a latent image is formed on the photoconductive drum 31 with a width greater than W0 width, a simple correspondence of the data stored in the bit map memory 160 would result in the shortage of the memory capacity.

In view of the above, in this embodiment the respective image data to be printed are accommodated in a closely adjacent fashion upon storing the data in the bit map memory 160 as shown in FIG. 6a, 6b and 6c, while the correspondency between the scanning position of the laser beam and the data reading timing is deviated when they are read out for printing. Specifically, as shown in FIG. 6d, when one end of the rolled sheet 11a is taken as a reference, the data reading is started after the elapse of a time TA in the case of utilizing a rolled sheet 13a (W0). In another case of using the rolled sheets 11a and 11b (W2), data reading is started at the time 0, is temporarily interrupted for a period of time TB after the elapse of the time T2, and is again started after the elapse of the time TB. In a further case of using the still narrower rolled sheets 12a and 12b (W3), data reading is started after the elapse of the time TC, is temporarily interrupted for the time TD after the elapse of the time T3 and then is started again after the elapse of the time period TD.

Figure 7:
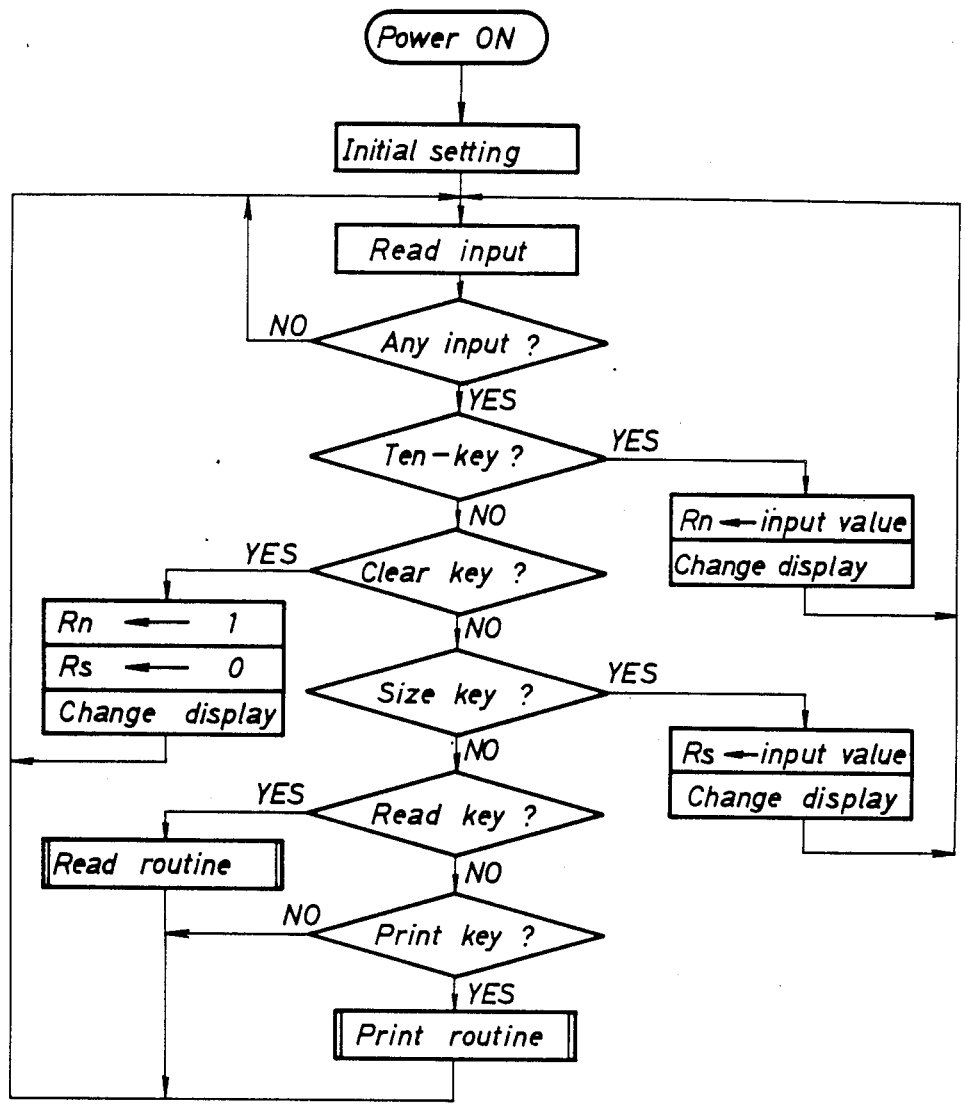
FIG. 7 is a flowchart relating to a control unit exemplified in FIG. 5.

FIG. 7 shows the schematic operation of the control unit shown in FIG. 5.

At first, the operation of the control unit 170 will be explained while referring to FIG. 7. When the power supply is turned ON, an initial setting is at first conducted. After the initial setting has been completed, states of signals outputted from various kinds of input devices, that is, the interface unit 120, the sensor unit 140, the key switch unit 150, etc. are read and stored. If there are no changes in the input state, reading for the input state as described above is repeated.

If there is an input from the ten-key switch 74, a numerical value corresponding to the key is loaded in the register Rn and the input value is displayed on the copy number display 73. When the clear key switch 75 is put to ON, "1" is set to the register Rn, while clearing the register Rs to "0" and setting the display on the copy number display 73 to "1".

When any one of the size key switches 76–81 is put to ON, a numeral value previously allocated to each key switch is loaded in the register Rs. In this embodiment, numerical values 1, 2, 3, 4, 5 and 6 are allocated to the size key switches 76, 77, 78, 79, 80 and 81, respectively. "0" is set to the register Rs in the initial state with no input.

When the read key switch 72 is set to ON, reading process is conducted. That is, the data outputted from the image scanner 100 or the CAD system 110 are read by way of the interface unit 120 and the data are, after a vector/laster conversion, stored in the predetermined position of the bit map memory 160.

In the reading process, the content in the register Rs is checked. If no size designation is made on the side of the printer, the magnification ratio is set to "1" and the value for the image size on the data sending side is set to the register Rs. If the register Rs contains a value other than 0, the magnifying ratio is calculated based on the value for the image size on the data sending side and the value loaded in the register Rs.

Then, data reading is executed till all of the data have been read and the interpolation or thinning is conducted to the data depending on the magnifying ratio. The results are stored in the bit map memory 160. The foregoing procedures are repeated. That is, since the size designation on the printer side has a preference, if the size designation on the side of the printer is A3 and the image size on the data sending side is A2, for example, the size of the image stored in the memory 160 is diminished by automatically conducting the thinning. When the reading has been completed, "1" is set to a flag F1. In the case of the data for the images smaller than A0 size, each data is stored into one of the partitions in the bit map memory 160 as shown in FIGS. 6a, 6b and 6c.

When the print key switch 71 is turned ON, the print routine is effected.

At first, the flag F1 is checked. If F1 is "0", since data have not yet been read, the step is returned to the main routine with no procedures. If the flag F1 is "1", the following procedures are carried out.

At first, the sheet feed means at top, middle and bottom positions are selected depending on the content in the register Rs. That is, if the value in the register Rs is 1, 2, 3, 4, 5 or 6, since this corresponds to the designation for landscape A0 size, portrait A1 size, landscape A2 size, portrait A3 size, landscape A3 size or portrait A4 size, respectively, top, top, middle, middle, bottom and bottom position is selected, respectively. In this case if there has already been present a selected rolled sheet, the roll is slightly retracted and, thereafter, newly selected rolled sheet is advanced to a position capable of sheet feeding.

Then, laser writing timing is set and the sheet cutting timing is set (refer to FIGS. 6a, 6b, 6c and 6d).

Then, the content in the register Rs is checked. If the value in the register Rs is "1", since the A0 size, namely the maximum print size, is designated, multiple printing is impossible. In this case, "1" is set to a register Rm and "0" is set to the flag F2.

If the value in the register Rs is other than "1", a value for the maximum possible number of partitions according to the content in the register Rs is loaded in the register Rm. That is, if the value in the register Rs is 2, 3, 4, 5 or 6, the value 2, 4, 8, 4 or 10 is loaded respectively in the register Rm, as explained previously referring to FIGS. 6a, 6b and 6c. Then, the data for one image stored in one partition in the bit map memory are copied in the remaining Rm−1 partitions in the memory 160. Thus, images by the same number as the value in the register Rm are arranged on the bit map memory 160.

Then, the value in the register Rn (set number for print copies) and the value in the register Rm (maximum possible number of partitions available at one time) are compared and if Rn>Rm, "1" is set to the flag F2 and the value : Rn−Rm is loaded in the register Rn. Otherwise, "0" is set to the flag F2 and the value of the register Rn is set to the register Rm.

Then, the content in the register Rm is checked. If the content in the register Rm is an even number, a ½ value of the content is loaded in registers Rr and Rl, respectively. If the content is an odd number, the value : (Rm+1)/2 is stored to the register Rr and the value : (Rm−1)/2 is stored to the register Rl, respectively. Values of the registers Rr and Rl correspond to the number of cut sheets on the left and right, that is, the respective number of copies to be printed on the left and right side, respectively. However, if Rs is 1 or 2, the value of Rm is simply moved to the registers and Rr and Rl.

The process control in printing procedures is known so far. When the print sheet feed timing is reached, driving for the selected rolled sheets is started. When the cutting timing for the printing sheets is reached, the rotary knife 22 is actuated to cut the rolled sheets. Then, "1" is subtracted from the content of the registers Rr and Rl and the result is checked. If the content of the register Rl is not "0", the foregoing operations are repeated. When the content of the register Rl becomes "0", driving for the rolled sheet on the left is interrupted. Then, if the content of the register Rr is not "0", one more procedure is repeated relating to the right side only, before driving for the rolled sheet on the right side is interrupted. Further, predetermined printing process controls are repeated till the sheets have been discharged completely. When it has been completed, the flag F2 is checked.

If the flag F2 is "0", the print routine is ended.

While on the other hand, if the content of the flag F2 is "1", the procedures are further repeated. That is, in the case where the set number for print copies (value in Rn) is greater than the maximum possible number of partition available at one time (value in Rm), the number of copies : Rn−Rm are still left unprinted after one print cycle. Operations are repeated until the value in the register Rn, where the remaining number of sheets is contained, is decreased less than the value in the register Rm. Then, the flag F2 is set to "0" and the printing is ended at that cycle.

In the foregoing example, the A series standard size sheets were handled. Every sheet in such a series has a length versus width ratio of square root 2 (1.41...), and the width is equal to the length of the next smaller size (W0=L1). Accordingly, the width is always two times of the width of the next-to-next smaller size (W0=2×W2).

Although the A series is very convenient to handle, other standard series (A-E) or off-standard sizes are also popular. Such non-ISO sizes may also be processed in accordance with the present invention, if rolled sheets corresponding to the width of the required size are prepared in advance. The timing to cut the sheet is determined in synchronization with the paper end signal, which was counted from number of pulses when the manuscript was read in the read routine by the image scanner 100. Any over-sized or under-sized image can be handled in this way of cutting (synchronized cut).

In the foregoing example, furthermore, only the one-to-one correspondence of the bit map memory to the print image was explained. However, with data compression (run length, for example) beforehand, more pages can be accomodated in the limited size of the memory. Proper real-time decoding is necessary in this case.

Still further, in the foregoing example, the requested copies of page 1 were printed first, before the machine processes page 2. Alternatively, as many pages as the capacity is available may be stored at one time and these pages are printed to give a collated set, before the process is repeated for the second set. This is an "electronic collating", compared to the customary mechanical collating.

What is claimed is:

1. An image printing device which comprises:
    (a) a line print means which scans across the whole width of the maximum print size,
    (b) a bit map memory means which memorizes the information to be printed, in an amount sufficient to store the data at every dot throughout the entire maximum print size,
    (c) a sheet feed means which supplies printing sheet to said line print means, and
    (d) a control means which, when the size of the image to be printed is no greater than one half of the width of the maximum print size, generates, from the information stored in said bit map memory means, at least two sets of image information in parallel in the width direction, drives said line print means according thereto, and prints on the sheets fed by said sheet feed means a plurality of images substantially at the same time.

2. An image printing device according to claim 1, wherein said at least two sets of image information are stored in different area of said bit map memory means.

3. An image printing device according to claim 1, wherein said at least two sets of image information are generated by duplication using an information in said bit map memory means a number of times.

4. An image printing device according to claim 1, wherein said sheet feed means comprises:

(a) the first sheet feed means which supplies the first sheet having the width of the maximum print size and (b) the second sheet feed means which supplies concurrently plural sets of the second sheet having a width not more than one half of the width of the maximum print size from different positions in the width direction; and wherein said control means selects, according to the image size to be printed, either one of said first sheet feed means or the second sheet feed means.

5. An image printing device according to claim 4, wherein, in addition to said first and second sheet feed means, said sheet feed means still comprises the third sheet feed means which is same as said second sheet feed means except the width and wherein said control means selects either one of said three sheet feed means.

6. An image printing device according to claim 1, wherein the width of the maximum print size is 16 inch or larger.

7. An image printing device according to claim 6, wherein said width corresponds to the A0 size.

8. An image printing device according to claim 1, wherein said sheet feed means comprises:

(a) a rolled sheet which is longer than the print size and (b) a cut means which is capable of cutting said rolled sheet in the transverse direction at any desired position, and wherein said control means drives said cut means according to the print size.

9. An image printing device according to claim 4 or 5, wherein said second and/or third sheet feed means sets each rolled sheet at different position on the same axis.

10. An image printing device according to claim 1, wherein said control means provides a switch means by which the number of prints is determined, writes said number of sets of print information in said bit map memory means and proceeds to printing process.

11. An image printing device according to claim 10, wherein said sheet feed means provides a plurality of sheet feed positions each of which supplies a rolled sheet having a width not more than one half of the width of the maximum print size, is driven independently with each other and is located at the different position in the width direction and wherein said control means determines the number of sheets to be supplied from each of said sheet feed means according to the number determined by said switch means and the number of the sheet feed positions.

* * * * *